United States Patent
Beccafico et al.

(10) Patent No.: US 6,959,547 B2
(45) Date of Patent: Nov. 1, 2005

(54) TANDEM MASTER CYLINDER FOR ELECTROHYDRAULIC BRAKING SYSTEMS

(75) Inventors: Nathalie Beccafico, Garges les Gonesses (FR); Jean-Pierre Delage, Le Perreux sur Marne (FR); Yannick Nen, La Varenne St Hilaire (FR); Stéphane Manfredini, Chatou (FR)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 10/490,188

(22) PCT Filed: Sep. 10, 2002

(86) PCT No.: PCT/FR02/03066
§ 371 (c)(1),
(2), (4) Date: Mar. 19, 2004

(87) PCT Pub. No.: WO03/024757
PCT Pub. Date: Mar. 27, 2003

(65) Prior Publication Data
US 2004/0239175 A1 Dec. 2, 2004

(30) Foreign Application Priority Data
Sep. 20, 2001 (FR) .......................................... 01 12164

(51) Int. Cl.[7] .............................................. B60T 7/04
(52) U.S. Cl. ..................................................... 60/562
(58) Field of Search ........................ 60/562, 566, 591; 92/255

(56) References Cited

U.S. PATENT DOCUMENTS 6,192,685 B1 * 2/2001 Bourlon et al. ............... 60/566

* cited by examiner

*Primary Examiner*—Thomas E. Lazo
(74) *Attorney, Agent, or Firm*—Warren Comstock; Leo H McCormick, Jr.

(57) ABSTRACT

This master cylinder comprises a body (12) defining a primary pressure chamber (14) and a secondary pressure chamber (16), separated by an axially movable piston (22), the so-called secondary piston; means (28) for the hydraulic connection of the primary pressure chamber (14) with braking-force simulation means (30); and complementary moving and stationary means (32, 34) for the sealing of the hydraulic connection means (28). The moving and stationary sealing means (32, 34) are borne by the secondary piston (22) and the body (12) respectively. The secondary piston (22) is axially movable between a rest position, in which the complementary sealing means (32, 34) are spaced apart from each other, and a position in which said complementary sealing means (32, 34) are cooperating with each other. The secondary piston (22) comprises two portions (22P, 22D), capable of an axial motion in relation to each other in order to adjust the relative axial position of the moving and stationary sealing means (32, 34) when the secondary piston (22) is in its rest position.

10 Claims, 2 Drawing Sheets

TANDEM MASTER CYLINDER FOR ELECTROHYDRAULIC BRAKING SYSTEMS

Figure 1:
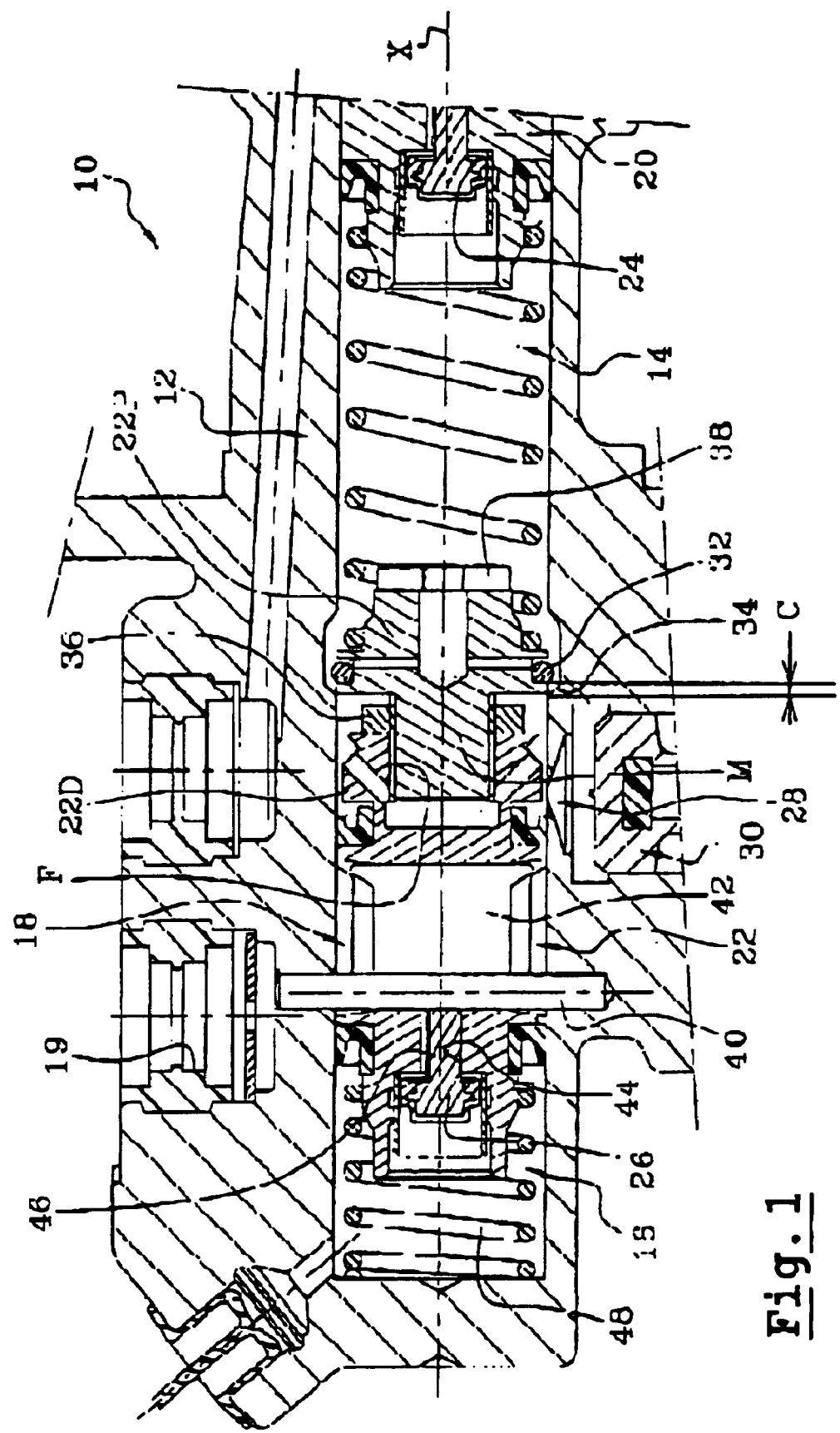

The present invention relates to a tandem master cylinder intended for an electrohydraulic braking system.

A tandem master cylinder intended for an electrohydraulic braking system is already well known from the state of the art, such device being of the type comprising:
- a body, defining primary and secondary pressure chambers, separated by an axially movable piston, the so-called secondary piston;
- means for the hydraulic connection of the primary pressure chamber with braking-force simulation means; and
- complementary moving and stationary means for the sealing of the hydraulic connection means, and borne by the secondary piston and the body respectively, the secondary piston being axially movable between a rest position, in which the moving and stationary sealing means are spaced apart from each other, and a position in which these moving and stationary sealing means are cooperating with each other.

Usually, the driver depresses a brake pedal, connected to the secondary piston, so as to control the braking of the vehicle and the travel of the brake pedal is transmitted to a hydraulic braking circuit through various means.

A braking system comprising a master cylinder of the above-mentioned type is capable of operating in both normal and emergency configurations.

When the braking system is in a normal braking mode, the hydraulic braking circuit is isolated from the master cylinder and the travel of the brake pedal is transmitted to the hydraulic braking circuit through electrical means.

On the other hand, when the braking system is in the emergency braking mode, the hydraulic braking circuit is connected with the master cylinder and the travel of the brake pedal is transmitted to the hydraulic braking circuit through the brake fluid, contained inside said master cylinder.

Usually, the stationary sealing means comprise an annular bearing seat, provided in the body, and the moving sealing means comprise a O-ring borne by the secondary piston and intended for a cooperation with such bearing seat.

In the normal braking configuration of the braking system, when the driver depresses the brake pedal, such action results in a travel of the secondary piston through a short stroke and consequently the moving and stationary sealing means may remain spaced apart from each other and, therefore, the hydraulic connection means may remain in the open state.

In such a normal operating configuration, the simulation means give the driver, as he depresses the brake pedal, a braking feeling like that he would get if the master cylinder were connected with the hydraulic braking circuit.

In the emergency operating configuration of the braking system, the force exerted by the driver on the brake pedal results in a travel of the secondary piston through a long stroke, at the end of which the moving and stationary sealing means are cooperating with each other, so as to close the hydraulic means connecting the primary pressure chamber with the braking-force simulation means.

During the long stroke of the piston, owing to the fact that the hydraulic connection means are not closed yet, some brake fluid is transferred from the primary pressure chamber into the simulation means. As a matter of fact, the smaller the quantity of brake fluid transferred to the simulation means, the faster the pressure rise in the primary pressure chamber, which means a more efficient braking operation.

The object of this invention is to limit as much as possible the stroke of the secondary piston when the driver depresses the brake pedal in an emergency braking configuration, so as to limit the quantity of brake fluid, which is transferred from the primary pressure chamber towards the braking-force simulation means.

To this end, the invention deals with a tandem master cylinder for an electrohydraulic braking system, of the above-mentioned type and characterised in that the secondary piston comprises two portions, capable of an axial motion in relation to each other in order to adjust the relative axial position of the moving and stationary sealing means when the secondary piston is in its rest position.

According to features of various embodiments of said master cylinder:
- these two portions of the secondary piston comprise male and female elements respectively, connecting up these portions of the secondary piston and provided with complementary threaded surfaces, in such a way that the male element constitutes a screw and the female element forms a nut;
- the master cylinder comprises means for the locking of the male and female elements in a predetermined relative position;
- the locking means comprise a check nut, screwed on the male element and resting on the female element;
- the locking means comprise at least a radial deformation of one of the threaded surfaces of the male and female elements;
- the stationary sealing means comprise an annular bearing seat provided in the body, and the moving sealing means comprise a O-ring, borne by the secondary piston and intended for a cooperation with said bearing seat;
- a first portion of the secondary piston is intended for a cooperation with a rest stop, rigidly linked with the body, while the second portion of the secondary piston bears the moving sealing means;
- the rest stop comprises a pin, which is rigidly linked with the body and which extends substantially transversely to the travel direction of the secondary piston, such pin being accommodated in an elongate cavity provided in the first portion of said piston;
- the elongate cavity communicates with a brake-fluid supply chamber, called the secondary supply chamber, the first portion of the secondary piston being provided with a passage connecting up the secondary supply and pressure chambers, and closable by a valve;
- the valve is fitted with a control stem, extending through the passage provided in the secondary piston, and intended for a cooperation with the bearing pin so as to keep the valve in the open position.

Figure 2:
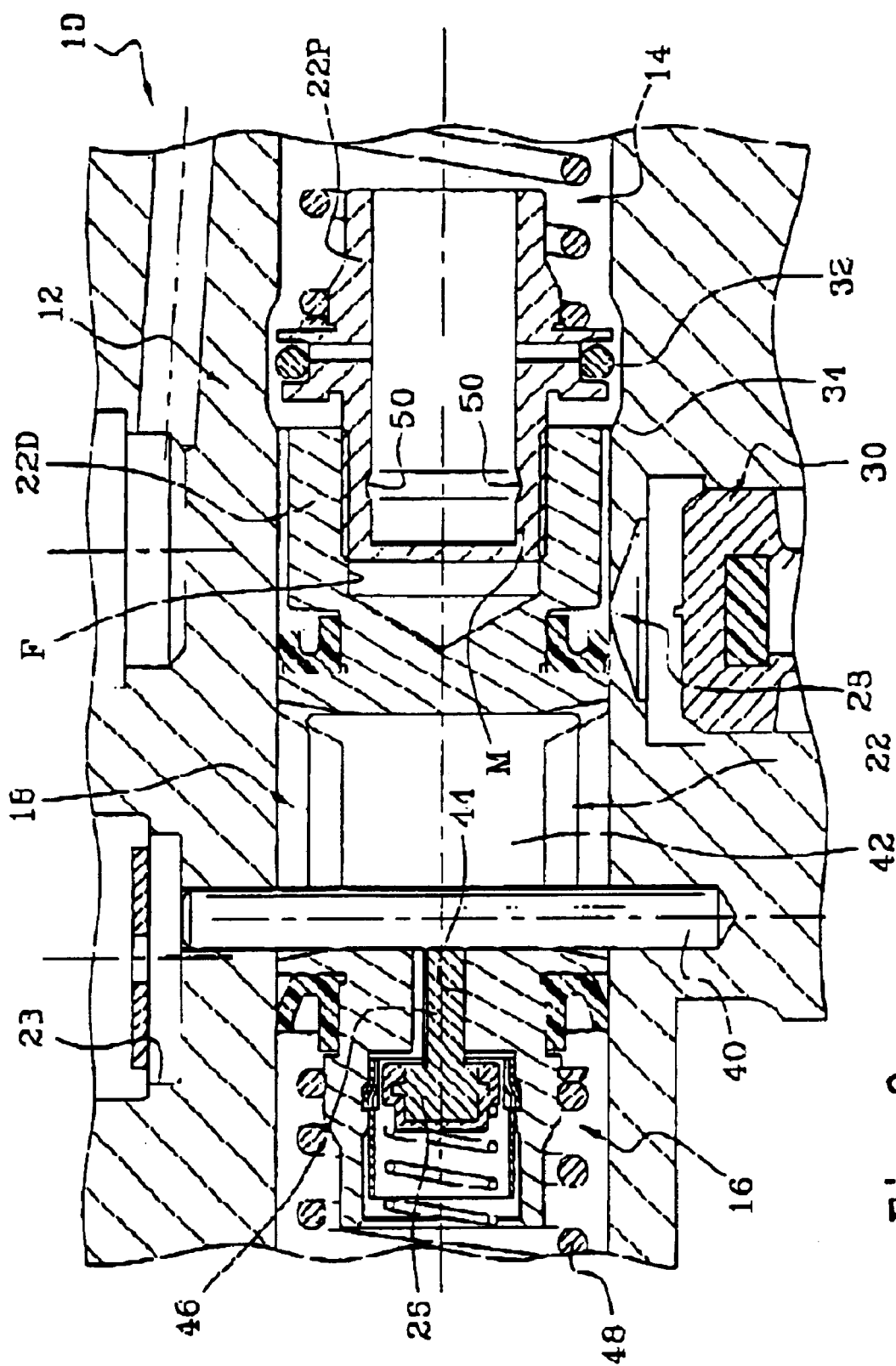

Other features and advantages of the present invention will be apparent from the following detailed description, by way of example and by no means as a limitation, when taken in conjunction with the accompanying drawings, in which FIGS. 1 and 2 are partial axial sectional views of a master cylinder for a braking system according to a first and a second embodiment of this invention, respectively.

FIG. 1 shows a tandem master cylinder for an electrohydraulic braking system according to a first embodiment of the invention, said master cylinder being generally referred to by 10 as a whole. In the described example, the tandem master cylinder 10 is of the valved type.

As a rule and throughout the following description, an element or a portion is called "proximal" when it is near the brake pedal actuated by the driver, taking into consideration the kinematic chain connecting said element or portion to the brake pedal, and it is called "distal" in the contrary case.

The master cylinder 10 comprises a body 12 defining two brake-fluid pressurizing chambers, which are usually called the primary pressure chamber 14 and the secondary pressure chamber 16.

The body 12 also defines a supply chamber 18 for the secondary pressure chamber 16. Such chamber 18, usually called the secondary supply chamber, is connected to a brake-fluid tank (not shown) through conventional means 19.

The master cylinder 10 also comprises two pistons, namely a primary piston 20 and a secondary piston 22. In a manner known per se, the primary piston 20 is connected to a brake pedal (not shown) to be depressed by the driver. And the secondary piston 22 separates the primary pressure chamber 14 from the secondary pressure chamber 16.

Both pistons 20, 22 bear conventional primary and secondary valves, 24 and 26 respectively.

The master cylinder 10 also comprises conventional means 28 for the hydraulic connection of the primary pressure chamber with conventional braking-force simulation means 30.

The hydraulic connection means 28 are closable using a O-ring 32, borne by the secondary piston 22 and intended for a cooperation with an annular bearing seat 34 provided in the body 12. The O-ring 32 and the bearing seat 34 are the respective complementary moving and stationary sealing means for the hydraulic connection means 28.

The secondary piston 22 is axially movable, parallel to the axis X represented in FIG. 1, between a rest position, in which the O-ring 32 and the bearing seat 34 are spaced apart from each other, and a position in which the O-ring 32 and the bearing seat 34 are cooperating with each other, with the result that the connection means 28 are closed.

The secondary piston 22 comprises two portions, i.e. a proximal portion 22P and a distal portion 22D, capable of an axial motion in relation to each other in order to adjust the relative axial position of the O-ring 32 and of the bearing seat 34 when the secondary piston 22 is in its rest position, as shown in FIG. 1.

The proximal portion 22P of the secondary piston comprises a male-threaded element M for a screwed cooperation with a female-threaded element F provided in the distal portion 22D of the secondary piston. The male element M constitutes a screw for a cooperation with the female element F, which forms a nut, so as to connect the proximal portion 22P with the distal portion 22D of the secondary piston.

A check nut 36 is intended to be screwed on the male element M, while resting on the female element F, so as to lock these elements M and F in a predetermined relative position.

In a preferred manner, the proximal portion 22P of the secondary piston comprises a transverse slot 38 intended for a conventional tool for the manoeuvring of such proximal portion.

The proximal portion 22P of the secondary piston bears the O-ring 32. The distal portion 22D of the secondary piston is intended for a cooperation with a pin 40, which is rigidly locked with the body 12 and which forms a rest stop, defining the rest position of the secondary piston 22.

The pin 40 extends substantially transversely to the travel direction of the secondary piston 22 and is accommodated in an elongate cavity 42 provided in the distal portion 22D of said piston.

The elongate cavity 42 communicates with the secondary supply chamber 18. The latter is capable of being connected with the secondary pressure chamber 16 through a passage 44, closable by means of the secondary valve 26.

The secondary valve 26 is fitted with a control stem 46, extending through the passage 44 and intended for a cooperation with the pin 40 so as to keep the valve 26 in the open position, when the secondary piston 22 is in its rest position, as shown in FIG. 1.

Quite conventionally, the secondary piston 22 is resiliently returned to its rest position by means of a spring 48, called the secondary spring.

As regards the adjustment of the stroke of the secondary piston 22 between its rest position, as shown in FIG. 1, and the position in which the connection means 28 are closed (cooperation of the O-ring 32 with the bearing seat 34), such stroke being called the dead stroke C, the following procedure may be carried out.

Initially, the secondary piston 22 is in its rest position as shown in FIG. 1, and the primary piston 20 has not been fitted yet inside the body 12 of the master cylinder.

The primary pressure chamber 14 is supplied with pressure gas, more particularly air, and a pressure sensor is arranged in the braking-force simulation means 30. A travel sensor is provided for the measurement of the travels of the secondary piston 22.

The connection means 28 being in the open state, the pressure air, contained inside the primary pressure chamber 14, flows into the braking-force simulation means 30.

Then, the secondary piston 22 is moved against the resilient returning force of the spring 48 until the connection means 28 are closed through the cooperation of the O-ring 32 with the bearing seat 34. Such sealing is detected by the pressure sensor because a pressure change appears in the braking-force simulation means 30.

The dead stroke C is determined using the travel sensor for the secondary piston 22.

Therefore, the value of the measured dead stroke C has only to be compared with the desired one and, if these values do not match, the dead stroke C is brought to the desired value by either screwing or unscrewing the proximal portion 22P of the secondary piston relative to the distal portion 22D of said piston.

Once the adjustment has been carried out, both parts 22P and 22D of the secondary piston are locked in position in relation to each other by the tightening of the check nut 26, after the secondary piston 22 has been removed from the body 12.

FIG. 2 shows a tandem master cylinder for an electrohydraulic braking system according to a second embodiment of the invention. In FIG. 2, the same reference numerals designate the same elements as in FIG. 1.

In this second embodiment of the invention, the proximal portion 22P of the secondary piston exhibits a generally tubular shape, closed at its distal end.

Therefore, the proximal portion 22P of the secondary piston defines an inner cavity for the insertion of a tool intended for the manoeuvring and/or the radial deformation of this proximal portion 22P.

Thus, once the dead stroke C has been adjusted through either the screwing or the unscrewing of the proximal portion 22P of the secondary piston relative to the distal portion 22D of said piston, these portions 22P and 22D are locked in position in relation to each other by the radial deformation of at least one of the threaded surfaces of the male and female elements, M and F respectively.

FIG. 2 illustrates inner dents 50 made in the proximal portion 22P of the piston, using a conventional tool so as to obtain a radial deformation of at least one of the threaded surfaces of the male and female elements, M and F respectively.

In this second embodiment of the invention, the secondary piston 22 does not need to be removed from the body 12 so as to lock both parts 22P and 22D in position in relation to each other.

Among the advantages afforded by this invention, it should be noted that the dead stroke of the secondary piston 22 can be easily adjusted and that, therefore, it is possible to limit the quantity of brake fluid, which is transferred from the primary pressure chamber 14 to the braking-force simulation means 30 when the driver depresses the brake pedal, as the braking system (including the master cylinder 10 according to the invention) is in the emergency operation configuration.

What is claimed is:

1. A master cylinder intended for an electrohydraulic braking system, of the type comprising:

a body (12), defining a primary pressure chamber (14) and a secondary pressure chamber (16), separated by an axially movable piston (22), the so-called secondary piston;

means (28) for the hydraulic connection of the primary pressure chamber (14) with braking-force simulation means (30); and complementary moving and stationary means (32, 34) for the sealing of the hydraulic connection means (28), and borne by the secondary piston (22) and the body (12) respectively, the secondary piston (22) being axially movable between a rest position, in which the moving and stationary sealing means (32, 34) are spaced apart from each other, and a position in which said moving and stationary sealing means (32, 34) are cooperating with each other, characterised in that the secondary piston (22) comprises two portions (22P, 22D), capable of an axial motion in relation to each other in order to adjust the relative axial position of the moving and stationary sealing means (32, 34) when the secondary piston (22) is in its rest position.

2. The master cylinder according to claim 1, characterised in that said portions (22P, 22D) of the secondary piston comprise a male element (M) and a female element (F) respectively, connecting up these portions of the secondary piston and provided with complementary threaded surfaces, in such a way that the male element (M) constitutes a screw and the female element (F) forms a nut.

3. The master cylinder according to claim 2, characterised in that it comprises means (36; 50) for the locking of the male element (M) and of the female element (F) in a predetermined relative position.

4. The master cylinder according to claim 3, characterised in that the locking means comprise a check nut (36), screwed on the male element (M) and resting on the female element (F).

5. The master cylinder according to claim 3, characterised in that the locking means comprise at least a radial deformation (50) of one of the threaded surfaces of the male element (M) and of the female element (F).

6. The master cylinder according to claim 5, characterised in that the stationary sealing means comprise an annular bearing seat (34) provided in the body, and in that the moving sealing means comprise a O-ring (32), borne by the secondary piston (22) and intended for a cooperation with said bearing seat (34).

7. The master cylinder according to claim 6, characterised in that a first portion (22D) of the secondary piston is intended for a cooperation with a rest stop (40), rigidly locked with the body, while the second portion (22P) of the secondary piston bears the moving sealing means (32).

8. The master cylinder according to claim 7, characterised in that the rest stop comprises a pin (40), which is rigidly locked with the body (12) and which extends substantially transversely to the travel direction of the secondary piston (22), such pin being accommodated in an elongate cavity (42) provided in the first portion (22D) of said piston.

9. The master cylinder according to claim 8, characterised in that the elongate cavity (42) communicates with a brake-fluid supply chamber (18), called the secondary supply chamber, and in that the first portion (22D) of the secondary piston is provided with a passage (44) connecting up the secondary supply chamber (18) and the secondary pressure chamber (16), and closable by a valve (26).

10. The master cylinder according to claim 9, characterised in that the valve (26) is fitted with a control stem (46), extending through the passage (44) provided in the secondary piston, and intended for a cooperation with the pin (40) so as to keep the valve (26) in the open position.

* * * * *